US011354496B2

(12) United States Patent
Nishioka

(10) Patent No.: US 11,354,496 B2
(45) Date of Patent: Jun. 7, 2022

(54) INFORMATION PROCESSING APPARATUS AND NON-TRANSITORY COMPUTER READABLE MEDIUM STORING PROGRAM

(71) Applicant: FUJIFILM Business Innovation Corp., Tokyo (JP)

(72) Inventor: Shintaro Nishioka, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/919,055

(22) Filed: Jul. 1, 2020

(65) Prior Publication Data

US 2021/0271808 A1 Sep. 2, 2021

(30) Foreign Application Priority Data

Feb. 28, 2020 (JP) .............................. JP2020-033759

(51) Int. Cl.
| | |
|---|---|
| *G06F 17/10* | (2006.01) |
| *G06F 40/194* | (2020.01) |
| *G06F 40/166* | (2020.01) |
| *G06V 30/413* | (2022.01) |
| *G06V 10/40* | (2022.01) |
| *G06V 30/10* | (2022.01) |

(52) U.S. Cl.
CPC .......... *G06F 40/194* (2020.01); *G06F 40/166* (2020.01); *G06V 30/413* (2022.01); *G06V 10/40* (2022.01); *G06V 30/10* (2022.01)

(58) Field of Classification Search
CPC . G06F 40/194; G06F 40/166; G06K 9/00456; G06K 9/46; G06K 2209/01
See application file for complete search history.

(56) References Cited

U.S. PATENT DOCUMENTS

| | | | | |
|---|---|---|---|---|
| 6,237,011 B1* | 5/2001 | Ferguson | .............. | G06F 40/166 |
| | | | | 715/234 |
| 6,324,555 B1* | 11/2001 | Sites | ....................... | G06F 40/10 |
| | | | | 707/E17.036 |
| 6,463,426 B1* | 10/2002 | Lipson | ................ | G06F 16/5838 |
| | | | | 707/E17.02 |
| 6,658,626 B1* | 12/2003 | Aiken | ................... | G06F 40/289 |
| | | | | 715/205 |
| 6,976,170 B1* | 12/2005 | Kelly | ....................... | G09B 7/02 |
| | | | | 713/181 |
| 6,981,225 B1* | 12/2005 | Gaudette | .............. | G06F 40/194 |
| | | | | 715/764 |
| 7,707,157 B1* | 4/2010 | Shen | ..................... | G06F 40/194 |
| | | | | 707/999.102 |

(Continued)

FOREIGN PATENT DOCUMENTS

| | | |
|---|---|---|
| JP | 2000285190 | 10/2000 |
| JP | 2007179307 | 7/2007 |

(Continued)

*Primary Examiner* — Shahid K Khan
(74) *Attorney, Agent, or Firm* — JCIPRNET

(57) ABSTRACT

An information processing apparatus includes a processor configured to: receive document data representing a document in a case of registering definition data which defines classification of the document, the document data being data for creating the definition data; and output a warning in a case where the document data is similar to another document data of another definition data already registered.

20 Claims, 14 Drawing Sheets

(56) References Cited

U.S. PATENT DOCUMENTS

| | | | |
|---|---|---|---|
| 7,908,279 B1* | 3/2011 | Thirumalai | G06F 40/194 |
| | | | 707/749 |
| 2002/0103834 A1* | 8/2002 | Thompson | G06K 9/03 |
| | | | 715/256 |
| 2002/0150300 A1* | 10/2002 | Lee | G06K 9/72 |
| | | | 382/229 |
| 2007/0294610 A1* | 12/2007 | Ching | G06F 16/94 |
| 2008/0044016 A1* | 2/2008 | Henzinger | G06F 16/958 |
| | | | 380/201 |
| 2012/0093421 A1* | 4/2012 | Kletter | G06V 30/418 |
| | | | 382/209 |

FOREIGN PATENT DOCUMENTS

| | | | | |
|---|---|---|---|---|
| JP | 2008250817 | 10/2008 | | |
| WO | WO-2014169334 A1 * | 10/2014 | | G06F 16/93 |

* cited by examiner

INFORMATION PROCESSING APPARATUS AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2020-033759 filed Feb. 28, 2020.

BACKGROUND

(i) Technical Field

The present invention relates to an information processing apparatus and a non-transitory computer readable medium storing a program.

(ii) Related Art

A document may be classified using definition data defined for each type of document. As a technique of classifying a document for each type of document, for example, a technique of classifying a document based on a predetermined feature is known.

JP2007-179307A discloses an apparatus that identifies a form by automatically selecting partial areas on the form that are effective in identification by learning, converting an input form image into a feature vector that is a combination of a plurality of pieces of feature data by applying a partial image filter to the partial areas, and calculating a distance between the feature vector and a vector registered in a dictionary by two-step processing.

JP2000-285190A discloses an apparatus that identifies a type of a form to be identified by extracting a plurality of pieces of feature data from an image of the form to be identified, comparing one of the plurality of pieces of feature data with feature data of a registration form, and comparing the other feature data of the plurality of pieces of feature data with the feature data of the registration form in a case where the type of the form to be identified cannot be identified.

JP2008-250817A discloses an apparatus that displays a difference in feature data for each specified area by generating feature data from input image data, extracting feature image data similar to the input image data based on the generated feature data and feature data stored in a memory, and specifying a difference in feature data based on the generated feature data and the feature data described in the extracted feature image data.

SUMMARY

On the other hand, it is not always possible to accurately classify a document based on predetermined features, and it may not be possible to accurately classify a document depending on setting of the features. For example, in a case where a plurality of similar features are set, a document may be misclassified.

Aspects of non-limiting embodiments of the present disclosure relate to an information processing apparatus and a non-transitory computer readable medium storing a program that allow, in registration of definition data as data for classifying a document by each type, a user to register the definition data with high accuracy in document classification in a case where document data representing a document is similar to another document data of another definition data already registered, the document data being data for creating the definition data, as compared with a case where the user is not notified that the document data is similar to the other document data.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provide an information processing apparatus including a processor configured to: receive document data representing a document in a case of registering definition data which defines classification of the document, the document data being data for creating the definition data; and output a warning in a case where the document data is similar to another document data of another definition data already registered.

BRIEF DESCRIPTION OF THE DRAWINGS

Exemplary embodiment(s) of the present invention will be described in detail based on the following figures, wherein.

DETAILED DESCRIPTION

Figure 1:
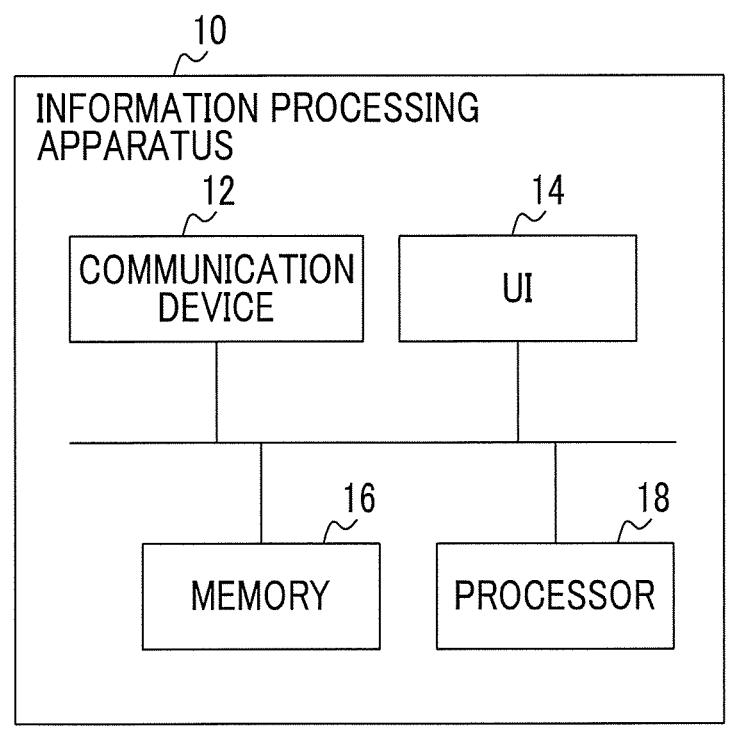
FIG. 1 is a block diagram illustrating a hardware configuration of an information processing apparatus according to the present exemplary embodiment.

A hardware configuration of an information processing apparatus according to the present exemplary embodiment will be described with reference to FIG. 1. FIG. 1 illustrates an example of the hardware configuration of the information processing apparatus 10 according to the present exemplary embodiment.

The information processing apparatus 10 is an apparatus used for registering or creating definition data, and is, for example, a desktop personal computer, a laptop computer, a workstation, a tablet, a smart phone, a scanner, a multifunction peripheral (for example, an apparatus including a scanner and a printer), a digital camera, or the like.

The definition data is data for classifying a document by type, and is data that defines classification of a document. The definition data, which is defined for each type of document, is created and registered. For example, the definition data is data in which document data, which is data representing a document, and information related to processing of classifying the document are associated with each other. The processing of classifying the document is, for example, processing of extracting information used for classifying the document (for example, information indicating a feature of the document) from the document data representing the document to be classified, comparing the extracted information with information similarly extracted from the document data included in the definition data, and classifying the document to be classified based on the comparison result. Examples of the processing of classifying a document include, for example, threshold value determination processing, patch processing, text recognition processing, and code processing. The processing will be described in detail later. The feature of the document includes, for example, contents of each item in the document, a layout of each item (for example, a position of each item in the document), or a text, a symbol, an image, or a figure described in the document.

For example, in a case where a similarity between the feature of the document to be classified and the feature extracted from the definition data of a certain document (for example, a document A) is equal to or higher than a threshold value, the document to be classified is classified as the document A. Of course, a value other than the similarity may be used.

Registration of the definition data is to store the definition data as data used for classifying the document. The definition data may be registered in the information processing apparatus 10, or may be registered in an apparatus other than the information processing apparatus 10.

For example, the information processing apparatus 10 receives document data, which is data for creating the definition data, and outputs a warning in a case where the document data is similar to another document data of another definition data already registered. The other document data is document data used for creating the other definition data.

A type or a format of the document data is not particularly limited. A concept of the document data includes, for example, image data representing a document, text data, document data created by word processing software, spreadsheet data created by spreadsheet software, and data displayed by a web browser.

As illustrated in FIG. 1, the information processing apparatus 10 includes, for example, a communication device 12, a UI 14, a memory 16, and a processor 18. The information processing apparatus 10 may include components other than these components.

The communication device 12 is a communication interface (such as a network interface) including a communication chip, and has a function of transmitting data to another apparatus and a function of receiving data transmitted from another apparatus.

The UI 14 is a user interface, and includes at least one of a display device and an operation device. The display device is a liquid crystal display, an EL display, or the like. The operation device is a keyboard, input keys, an operation panel, or the like. The UI 14 may be a UI such as a touch panel including a display device and an operation device.

The memory 16 is a device that includes one or a plurality of storage areas for storing data. The memory 16 is, for example, a hard disk drive, various types of memory (for example, a RAM, a DRAM, a ROM, or the like), another storage device (for example, an optical disk or the like), or a combination thereof. The memory 16 may store the definition data of each document. Of course, the definition data of each document may be stored in an apparatus other than the information processing apparatus 10.

The processor 18 is configured to control an operation of each unit of the information processing apparatus 10. The processor 18 may include a memory. For example, the processor is configured to receive document data for which the definition data is to be registered and output a warning in a case where the document data is similar to another document data of another definition data already registered. For example, the processor 18 causes the display device of the UI 14 to display information indicating a warning (for example, a message or the like).

Figure 2:
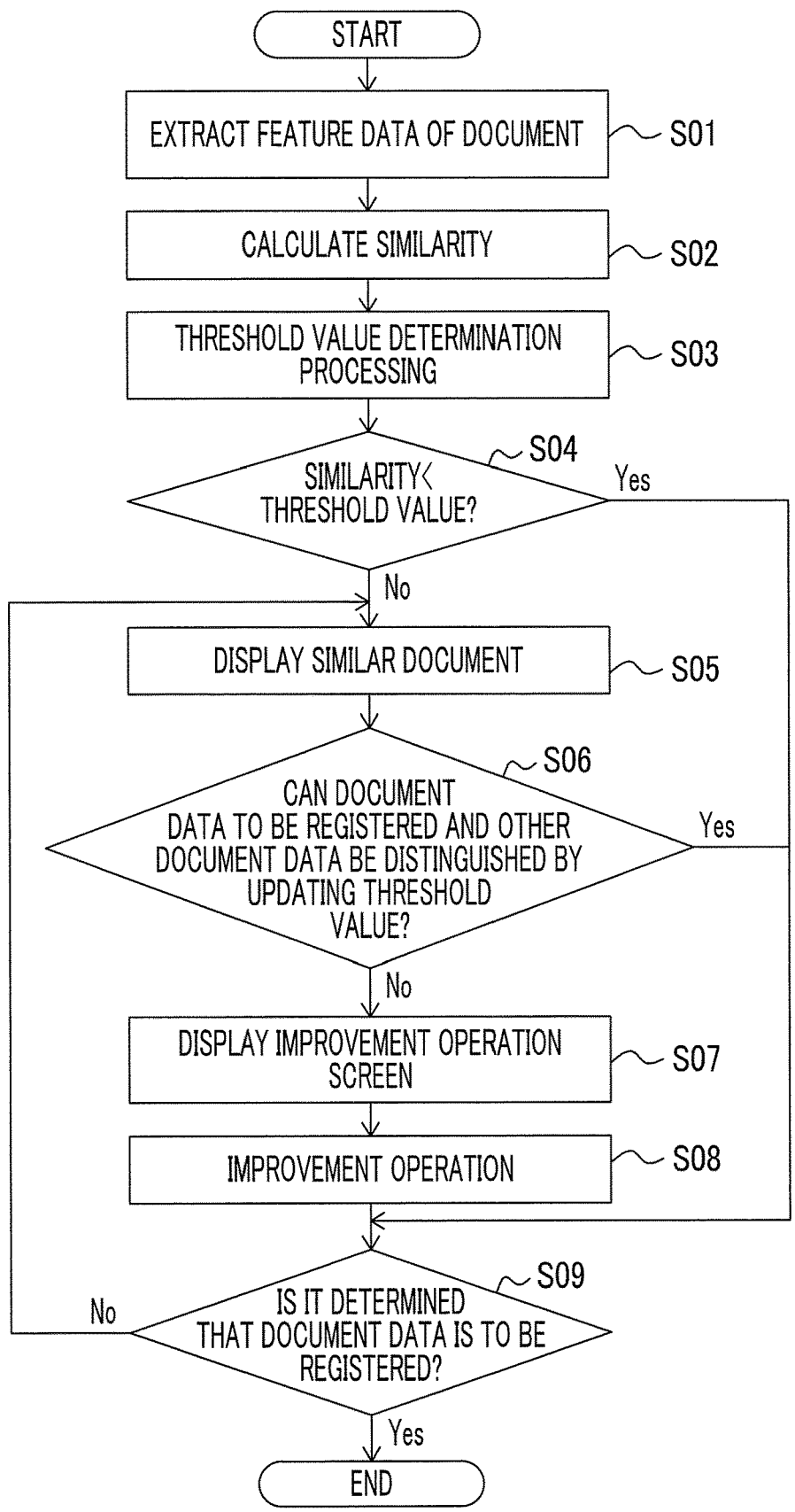
FIG. 2 is a flowchart illustrating processing by the information processing apparatus according to the present exemplary embodiment.

Hereinafter, an example of processing performed by the information processing apparatus 10 will be described with reference to FIG. 2. FIG. 2 is a flowchart illustrating the processing.

First, the processor 18 receives document data for which the definition data is to be registered (hereinafter, referred to as "document data to be registered"), and extracts feature data of the document data to be registered (S01). For example, the feature data is extracted by using a known technique. The processor 18 may extract feature data of the document data based on, for example, contents of each item in the document represented by the document data to be registered, a layout of each item, or a text, a symbol, an image, or a figure described in the document.

Next, the processor 18 compares the feature data of the document data to be registered with the feature data of the other document data of the other definition data already registered, and calculates a similarity between the document data to be registered and the other document data (S02). The feature data of the other document data may be extracted in advance, or may be extracted at this step. The processor 18 calculates the similarity between the document data to be registered and the other document data for each document data. For example, the similarity is calculated by using a known technique.

Next, the processor 18 performs threshold value determination processing (S03). The threshold value determination processing is processing of determining whether or not the document data to be registered and the other document data are similar to each other based on the similarity and a predetermined threshold value.

In a case where the similarity between the document data to be registered and the other document data is lower than the threshold value, the processor 18 determines that the document data to be registered and the other document data are not similar. In a case where the similarity between the document data to be registered and the other document data is lower than the threshold value for all other document data (Yes in S04), the processing proceeds to step S09.

In step S09, a user determines whether or not to register the document data to be registered as definition data. In a case where the user determines that the document data to be registered is to be registered as definition data (Yes in S09), the processor 18 associates the document data to be registered with information related to the threshold value determination processing as information related to the document classification processing, and registers, as definition data, data in which the document data to be registered and the information related to the threshold value determination processing are associated with each other. In a case of classifying a document, the document is classified by the threshold value determination processing. For example, the feature data of the document data representing the document to be classified is extracted, the feature data is compared with the feature data of the document data included in the definition data, and the document to be classified is classified based on the comparison result. For example, in a case where the similarity is calculated based on pieces of the feature data and the similarity is equal to or higher than the threshold value, the document to be registered is classified into document represented by the definition data. That is, the definition data including the feature data, of which the similarity with the document data to be classified is equal to or higher than the threshold value, is specified, and the document to be classified is classified into the document represented by the specified definition data.

In a case where the user determines that the document data to be registered is not to be registered as definition data (No in S09), the processing proceeds to step S05.

In step S04, in a case where there is another document data of which the similarity with the document data to be registered is equal to or higher than the threshold value (No in S04), the processor 18 causes the display device of the UI 14 to display the document represented by the other document data (S05). At this time, the processor 18 outputs a warning. For example, the processor 18 causes the display device of the UI 14 to display information indicating a warning. Further, in a case where, in step S09, the user determines that the document data to be registered is not to be registered as definition data (No in S09), the processor 18 causes the display device of the UI 14 to display the document represented by the other document data.

Next, the processor 18 determines whether or not the document data to be registered and the other document data can be distinguished by the threshold value determination processing by updating the threshold value used in the threshold value determination processing (S06). The updated threshold value is determined based on, for example, an empirical rule. Specifically, the processor 18 uses, as a threshold value, a value by which registered another document data and the document data to be registered can be distinguished from each other only by comparing the pieces of feature data. In a case where the threshold value is too small, in a step of registering definition data, it is determined that the document data to be registered is not similar to the registered another document data, and thus the document data to be registered is registered as definition data. On the other hand, in a step of actually classifying a document, the document may not be accurately classified using the definition data. Further, in a case where the threshold value is too large, in a step of classifying a document, the document can be classified using the definition data. On the other hand, in a step of registering the definition data, document data that is estimated not to be similar to another document data may be determined to be similar to another document data, and as a result, the document data may not be registered as definition data. Therefore, a value that is neither too small nor too large is set as the threshold value. For example, a value which is adjusted in the document classification step may be used as the threshold value.

In a case where the processor 18 determines that the document data to be registered and the other document data can be distinguished by the threshold value determination processing by updating the threshold value (Yes in S06), the processing proceeds to step S09. In this case, as described above, the definition data is registered or not registered depending on the determination of the user.

In a case where the processor 18 determines that the document data to be registered and the other document data cannot be distinguished by the threshold value determination processing by updating the threshold value (No in S06), the processing proceeds to step S07.

In step S07, the processor 18 causes the display device of the UI 14 to display a screen presenting processing of distinguishing the document data to be registered from another document data by processing other than the threshold value determination processing (hereinafter, referred to as "improvement operation screen") to the user. It can be said that the processing other than the threshold value determination processing is processing of classifying a document by processing other than comparison of the feature data. The processing other than the threshold value determination processing is, for example, patch processing, text recognition processing, or code processing. On the improvement operation screen, the user can perform an operation (hereinafter, referred to as "improvement operation") for setting the processing other than the threshold value determination processing (for example, patch processing, text recognition processing, or code processing). The patch processing, the text recognition processing, and the code processing correspond to an example of partial area determination processing, which is processing of distinguishing the document data based on a partial area of the document data. In this way, the user is informed of a plurality of pieces of partial area determination processing.

The patch processing is processing of distinguishing document data by comparing information (for example, a text, a symbol, an image, a figure, a line, or the like) extracted from a specific area in a document. Hereinafter, the specific area to which the patch processing is applied will be referred to as "patch". The text recognition processing is processing of recognizing a text from a document by optical character recognition (OCR) or the like and distinguishing document data based on the recognized text. The code processing is processing of distinguishing document data using a code such as a barcode or a two-dimensional code described in a document. For example, information indicating a type of a document is coded and described in the document. Therefore, the code includes information indicating the type of the document, and the type of the document can be specified by reading the code.

For example, in a case where one of the patch processing, the text recognition processing, and the code processing is selected as processing of distinguishing the document data (S08), the processor 18 associates the document data to be registered with information related to the selected processing as information related to the document classification processing, and registers, as definition data, data in which the document data to be registered and the information related to the selected processing are associated with each other (S09). The selection may be performed by the user, or may be performed by the processor 18. At least one of the patch processing, the text recognition processing, and the code processing may be selected as processing of distinguishing the document data.

For example, in document classification, in a case where the definition data associated with the information related to the patch processing is used, information is extracted from the patch defined in the definition data of the document to be classified, the extracted information is compared with the information extracted from the patch in the document represented by the definition data, and the document to be classified is classified based on the comparison result. For example, in a case where the similarity is calculated based on pieces of the information and the similarity is equal to or higher than the threshold value, the document to be classified is classified into document represented by the definition data.

In document classification, in a case where the definition data associated with the information related to the text recognition processing is used, a result of the text recognition processing on the document to be classified is compared with a result of the text recognition processing on the document represented by the definition data, and the document to be classified is classified based on the comparison result. For example, in a case where the similarity is calculated based on both results and the similarity is equal to or higher than the threshold value, the document to be classified is classified into document represented by the definition data.

In document classification, in a case where the definition data associated with the information related to the code processing is used, the code described in the document to be classified is read, and the document to be classified is classified based on the read result.

Figure 3:
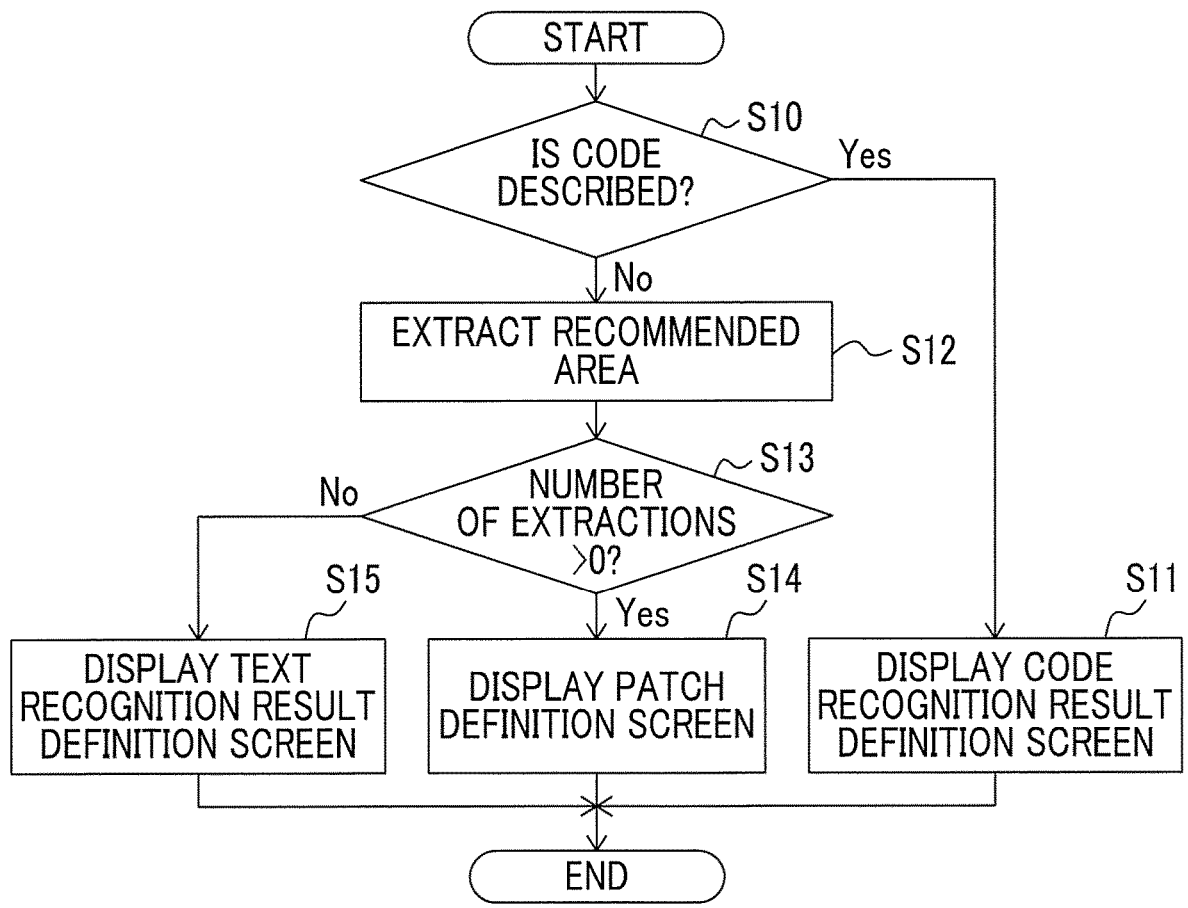
FIG. 3 is a flowchart illustrating processing by the information processing apparatus according to the present exemplary embodiment.

Hereinafter, processing of step S07 will be described in detail with reference to FIG. 3. FIG. 3 is a flowchart illustrating the processing.

First, the processor 18 determines whether or not a code such as a barcode or a two-dimensional code is described in the document represented by the document data to be registered (S10). The processor 18 may search a code on the entire document, or may search a code on an area of the document designated by the user.

In a case where a code is described in the document to be registered (Yes in S10), the processor 18 causes the display device of the UI 14 to display a code recognition result definition screen (S11). The code recognition result definition screen is an example of the improvement operation screen, and is a screen for setting a code for classifying a document. The user can set a code on the code recognition result definition screen. The setting operation is an example of the improvement operation. The processor 18 creates definition data including information indicating contents of the setting (that is, definition data in which the document data to be registered and the information related to the code processing are associated with each other).

In a case where a code is not described in the document to be registered (No in S10), the processor 18 extracts an area appropriate for the patch processing from the document represented by the document data to be registered, as a recommended area (S12). The recommended area is an area that can be distinguished from an area in another document represented by registered another document data. For example, the processor 18 extracts, as a recommended area, an area which is an area in the document to be registered and from which information (for example, a text, a symbol, an image, a figure, a line, or the like) is extracted, a difference between the information and information extracted from an area in another document being equal to or larger than a threshold value.

In a case where a recommended area is extracted (Yes in S13), the processor 18 causes the display device of the UI 14 to display a patch definition screen (S14). The patch definition screen is an example of the improvement operation screen, and is a screen for setting a patch for which the patch processing is performed in a step of classifying a document. The user can set a patch for which the patch processing is performed, on the patch definition screen. The setting operation is an example of the improvement operation. The processor 18 creates definition data including information indicating contents of the setting (that is, definition data in which the document data to be registered and the information related to the patch processing are associated with each other).

In a case where a recommended area is not extracted (No in S13), the processor 18 causes the display device of the UI 14 to display a text recognition result definition screen (S15). The text recognition result definition screen is an example of the improvement operation screen, and is a screen for setting an area in which the text recognition processing is performed in a step of classifying a document. The user can set an area in which the text recognition processing is performed, on the text recognition result definition screen. The setting operation is an example of the improvement operation. The processor 18 creates definition data including information indicating contents of the setting (that is, definition data in which the document data to be registered and the information related to the text recognition processing are associated with each other).

As described above, in a case where an area that can be distinguished from an area in another document (that is, a recommended area) is not extracted from the document to be registered, the processor 18 informs the user that it is necessary to distinguish the document data to be registered from another document data by the text recognition processing. That is, in a case where the document can be classified by the patch processing, the patch processing is recommended to the user, and in a case where the document cannot be classified by the patch processing, the text recognition processing is recommended to the user. For example, in a case where there is almost no difference in images and it is difficult to classify the document by the patch processing (for example, in a case where only the year printed on the document is different from another document), the text recognition processing is recommended to the user.

In a case where the document includes a plurality of pages, the processor 18 creates definition data for each page by performing the processing of steps S01 to S15 for each page.

Hereinafter, processing performed by the information processing apparatus 10 will be described in detail with a specific example.

Figure 4:
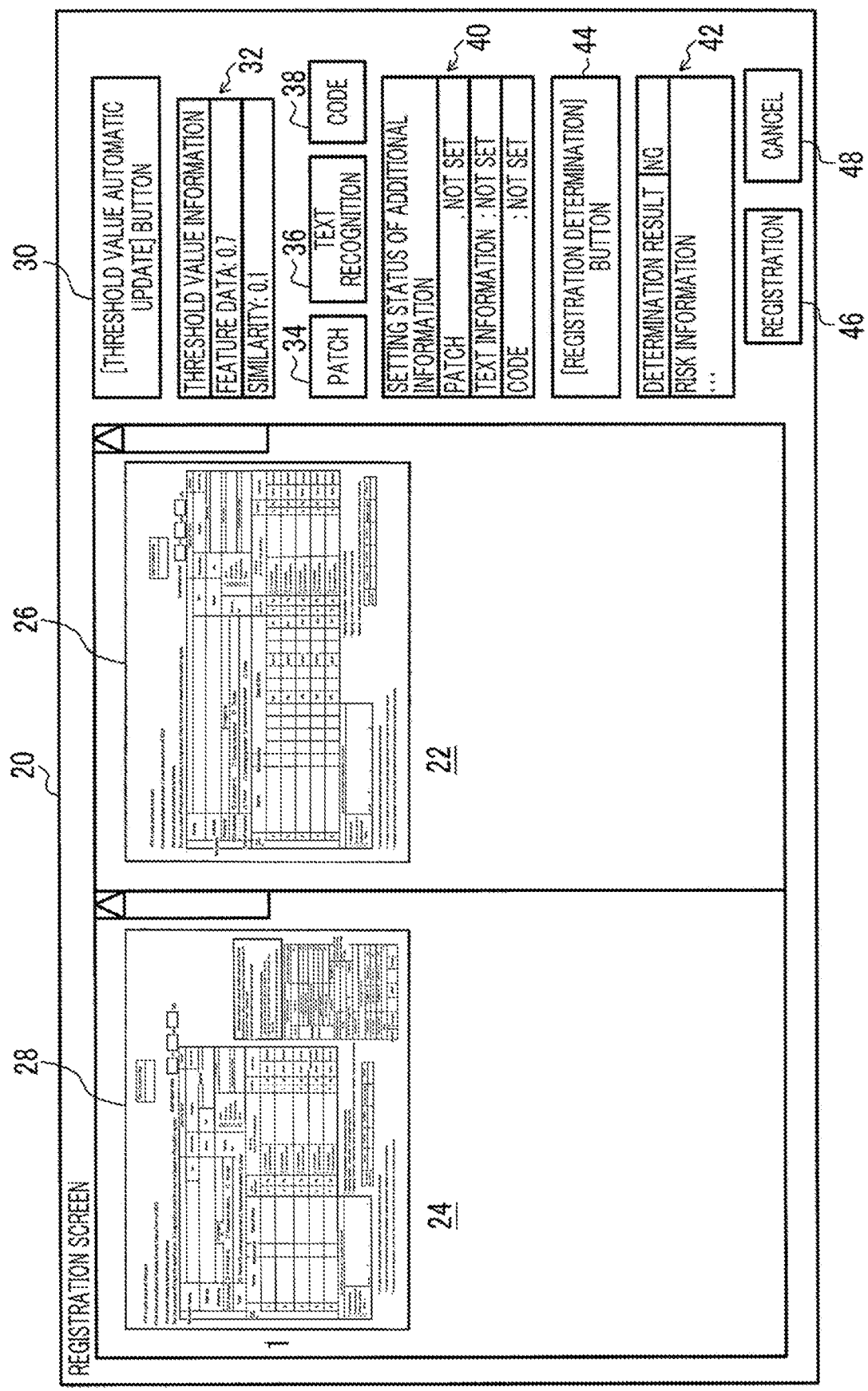
FIG. 4 is a diagram illustrating a registration screen.

FIG. 4 illustrates an example of a registration screen. The registration screen 20 is a screen for registering definition data, and is, for example, a screen displayed in step S05.

The registration screen 20 includes a display area 22 that is an area in which a document to be registered is displayed and a display area 24 that is an area in which a document with registered definition data is displayed. A document 26 to be registered is displayed in the display area 22. A registered document 28 is displayed in the display area 24. The document 28 is another document of which the similarity with the document 26 to be registered is equal to or higher than a threshold value. The documents 26 and 28 are, for example, forms. The processor 18 may display, on the registration screen 20, information (for example, a warning message) indicating that there is another document 28 of which the similarity with the document 26 to be registered is equal to or higher than a threshold value. To display another document 28 on the registration screen 20 may be to output a warning.

In a case where another document that is similar to the document 26 (for example, a document of which the similarity with the document 26 is equal to or higher than a threshold value) is not registered, the processor 18 may not display the registered document, and may display another document that is most similar to the document 26 (for example, a document of which the similarity with the document 26 is lower than the threshold value and which has the highest similarity).

Further, on the registration screen 20, a button 30 for instructing automatic update of the threshold value, which is used in the threshold value determination processing, and information related to the threshold value, which is as indicated by a reference numeral 32, are displayed. For example, the feature data (for example, 0.7) calculated from the document data representing the document 26 and the similarity (for example, 0.1) between the document 26 and the document 28 are displayed as information related to the threshold value. In a case where the button 30 is pressed, the processing of step S06 is performed.

Further, buttons 34, 36, and 38 are displayed on the registration screen 20. In a case where the button 34 is pressed, the patch definition screen is displayed. In a case where the button 36 is pressed, the text recognition result definition screen is displayed. In a case where the button 38 is pressed, the code recognition result definition screen is displayed. The buttons 34, 36, and 38 correspond to an example of instruction portions that define each of pieces of the partial area determination processing. In this way, the buttons 34, 36, and 38 are displayed on the same screen.

Further, as indicated by a reference numeral 40, on the registration screen 20, a setting status of the patch processing, a setting status of the text recognition processing, and a setting status of the code processing are displayed. In this way, the setting status of the partial area determination processing is displayed.

Further, as indicated by a reference numeral 42, on the registration screen 20, risk information may be displayed. The risk information is information indicating a risk that may occur in a case where a document is classified using the definition data of the document 26. The risk information is, for example, information on accuracy of document classification. A button 44 is displayed on the registration screen 20, and in a case where the button 44 is pressed, the processor 18 calculates a risk and displays risk information on the registration screen 20.

Further, buttons 46 and 48 are displayed on the registration screen 20. The button 46 is a button for instructing registration of definition data. In a case where the button 46 is pressed, definition data including the set contents is registered. The button 48 is a button for instructing cancellation of registration of definition data. In a case where the button 48 is pressed, definition data is not created, and the processing is ended.

Figure 5:
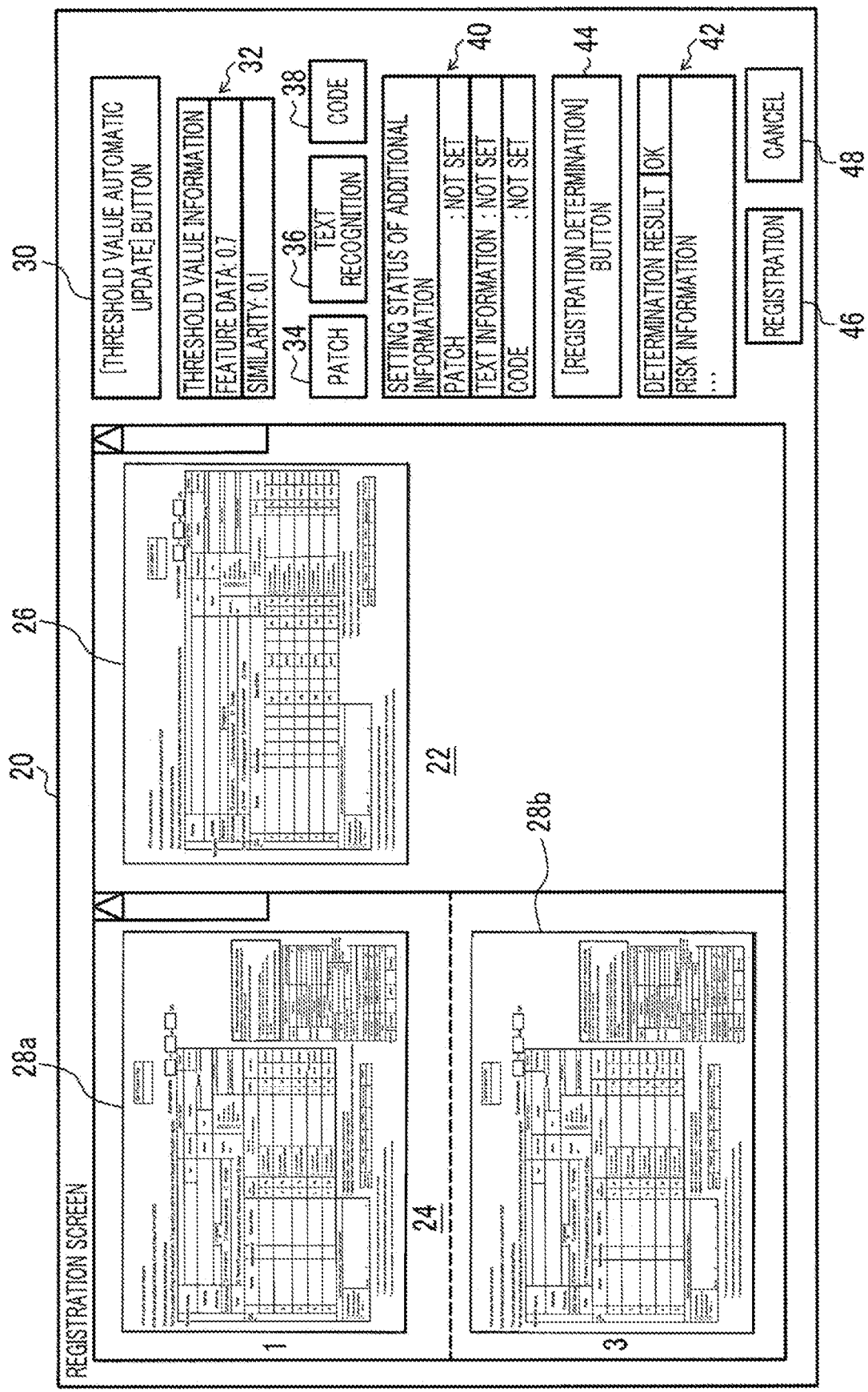
FIG. 5 is a diagram illustrating a registration screen.

Further, in a case where the document includes a plurality of pages, the processor 18 determines, for each page, whether or not a similarity between pages is equal to or higher than a threshold value, and displays, on the registration screen 20, a page of which the similarity is equal to or higher than the threshold value. An example of the display is illustrated in FIG. 5. The similarity between a first page 28*a* of the registered document 28 and the document 26 to be registered is equal to or higher than a threshold value, and the similarity between a third page 28*b* of the document 28 and the document 26 is equal to or higher than a threshold value or more. Thus, the first page 28*a* and the third page 28*b* are displayed side by side in the display area 24 by being distinguished by a separator or the like. In a case where the user selects a registered page on the registration screen 20, a similarity between the selected page and the document 26 is displayed as information related to a threshold value. In the example illustrated in FIG. 5, the first page 28*a* is selected by the user, and the similarity between the first page 28*a* and the document 26 is displayed as information related to the threshold value.

In a case where the document data to be registered can be distinguished from another document data by updating the threshold value and performing the threshold value determination processing, the processor 18 enables the button 30 for instructing automatic update of the threshold value used in the threshold value determination processing. In a case where the document data to be registered cannot be distinguished from another document data by updating the threshold value and performing the threshold value determination processing, the processor 18 disables the button 30. Enabling the button means a state where the user is allowed to input an instruction by pressing the button, and disabling the button means a state where the user is not allowed to input an instruction by pressing the button. In a case where the button 30 is enabled, the user can instruct automatic update of the threshold value by pressing the button 30. For example, the disabled button is displayed in a gray-out state. In the example illustrated in FIG. 4, it is determined that the document 26 and the document 28 can be distinguished from each other by the threshold value determination processing, and thus the button 30 is enabled.

Even in a case where the button is disabled, the disabled button may be pressed by the user. In this case, the processor 18 may not receive the instruction given by press of the button or cancel the instruction.

Further, in a case where the document data to be registered cannot be distinguished from another document data by updating the threshold value and performing the threshold value determination processing, the processor 18 enables buttons for displaying the improvement operation screen. Specifically, the processor 18 enables the button 34 for displaying the patch definition screen, the button 36 for displaying the text recognition result definition screen, and the button 38 for displaying the code recognition result definition screen. The processor 18 may display the contents of the improvement operation on the registration screen 20 in a display form such as pop-up.

The processor 18 may enable only the button for displaying the improvement operation screen for setting a recommended improvement operation. For example, in a case where a code is described in the document to be registered, the processor 18 enables only the button 38. In a case where a code is not described in the document to be registered and a recommended area appropriate for the patch processing is extracted, the processor 18 enables only the button 34. In a case where a code is not described in the document to be registered and a recommended area is not extracted, the processor 18 enables only the button 36.

In a case where an improvement operation is performed on the improvement operation screen and the improvement operation is completed, the processor 18 may enable the button 44 for calculating a risk. In a case where the button 44 is pressed, the processor 18 calculates a risk in a case where the document is classified using the definition data including the contents set on the improvement operation screen, and displays risk information indicating the risk on the registration screen 20. The processor 18 may enable the button 46 for registering the definition data in a case where the calculated risk falls within an allowable range, and disable the button 46 in a case where the calculated risk does not fall within the allowable range. In a case where the button 46 is pressed, the definition data of the document 26 is registered.

The same applies to the case where the document data to be registered can be distinguished from another document data by updating the threshold value and performing the threshold value determination processing. That is, in this case, the processor 18 enables the button 44 for calculating a risk, calculates a risk in a case where the document is classified by the threshold value determination processing, and displays risk information indicating the risk on the registration screen 20. In a case where the calculated risk falls within the allowable range, the processor 18 enables the button 46 for registering the definition data.

In a state where the document data to be registered can be distinguished from another document data by the threshold value determination processing, in a case where the button 46 for registration is pressed, the processor 18 associates the document data to be registered with information related to the threshold value determination processing as information related to the document classification processing, and registers, as definition data, data in which the document data to be registered and the information related to the threshold value determination processing are associated with each other.

In a state where the patch processing is set, in a case where the button 46 for registration is pressed, the processor associates the document data to be registered with information related to the patch processing as information related to the document classification processing, and registers, as definition data, data in which the document data to be registered and the information related to the patch processing are associated with each other.

In a state where the text recognition processing is set, in a case where the button 46 for registration is pressed, the processor 18 associates the document data to be registered with information related to the text recognition processing as information related to the document classification processing, and registers, as definition data, data in which the document data to be registered and the information related to the text recognition processing are associated with each other.

In a state where the code processing is set, in a case where the button 46 for registration is pressed, the processor associates the document data to be registered with information related to the code processing as information related to the document classification processing, and registers, as definition data, data in which the document data to be registered and the information related to the code processing are associated with each other.

Figure 6:
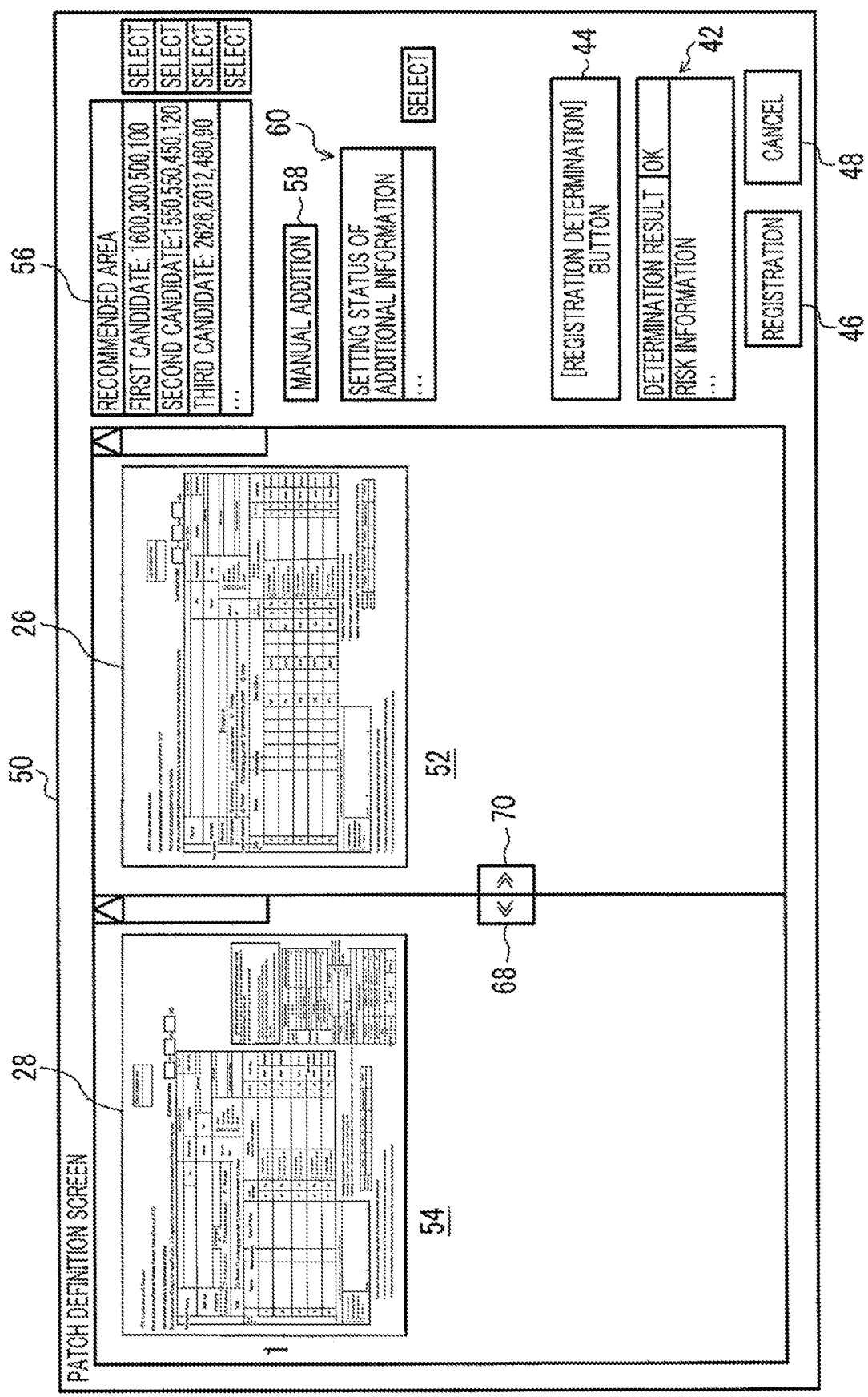
FIG. 6 is a diagram illustrating a patch definition screen.

Hereinafter, the patch processing will be described. FIG. 6 illustrates an example of a patch definition screen.

The patch definition screen 50 includes a display area 52 that is an area in which a document to be registered is displayed and a display area 54 that is an area in which a document with registered definition data is displayed. A document 26 to be registered is displayed in the display area 52. A registered document 28 is displayed in the display area 54. The document 28 is another document of which the similarity with the document 26 to be registered is equal to or higher than a threshold value.

A list 56 of recommended areas appropriate for the patch processing is displayed on the patch definition screen 50. For example, the list 56 illustrates coordinates of each recommended area in the document 26. For example, the processor 18 scans a scan area having a predetermined size and a predetermined shape for the document data representing the document 26 and the document data representing the document 28, and searches a scan area in which information extracted from the scan area in the document 26 and information extracted from the scan area in the document 28 are not similar. More specifically, the processor 18 extracts information (for example, a text, a symbol, an image, a figure, a line, or the like) from the scan area at each position in the document data representing the document 26 and the document data representing the document 28, while changing a position of the scan area for each predetermined position interval. Then, the processor 18 compares, for each position, the information extracted from the scan area in the document 26 with the information extracted from the scan area in the document 28, and searches a scan area in which these pieces of information are not similar to each other (for example, a scan area in which a difference between the information extracted from the document 26 and the information extracted from the document 28 is equal to or larger than a threshold value). The processor 18 specifies the scan area as a recommended area. In a case of classifying a document to be classified, by performing the patch processing using such a recommended area, it is possible to accurately classify the document to be classified as compared with a case where the patch processing is performed using an area other than the recommended area.

Further, a button 58 for allowing the user to manually set an area in which the patch processing is performed is displayed on the patch definition screen 50. In a case where the area in which the patch processing is performed is set by the user, information on the area is displayed as indicated by a reference numeral 60.

Further, similar to the registration screen 20, risk information and buttons 44, 46, and 48 are displayed on the patch definition screen 50.

Figure 7:
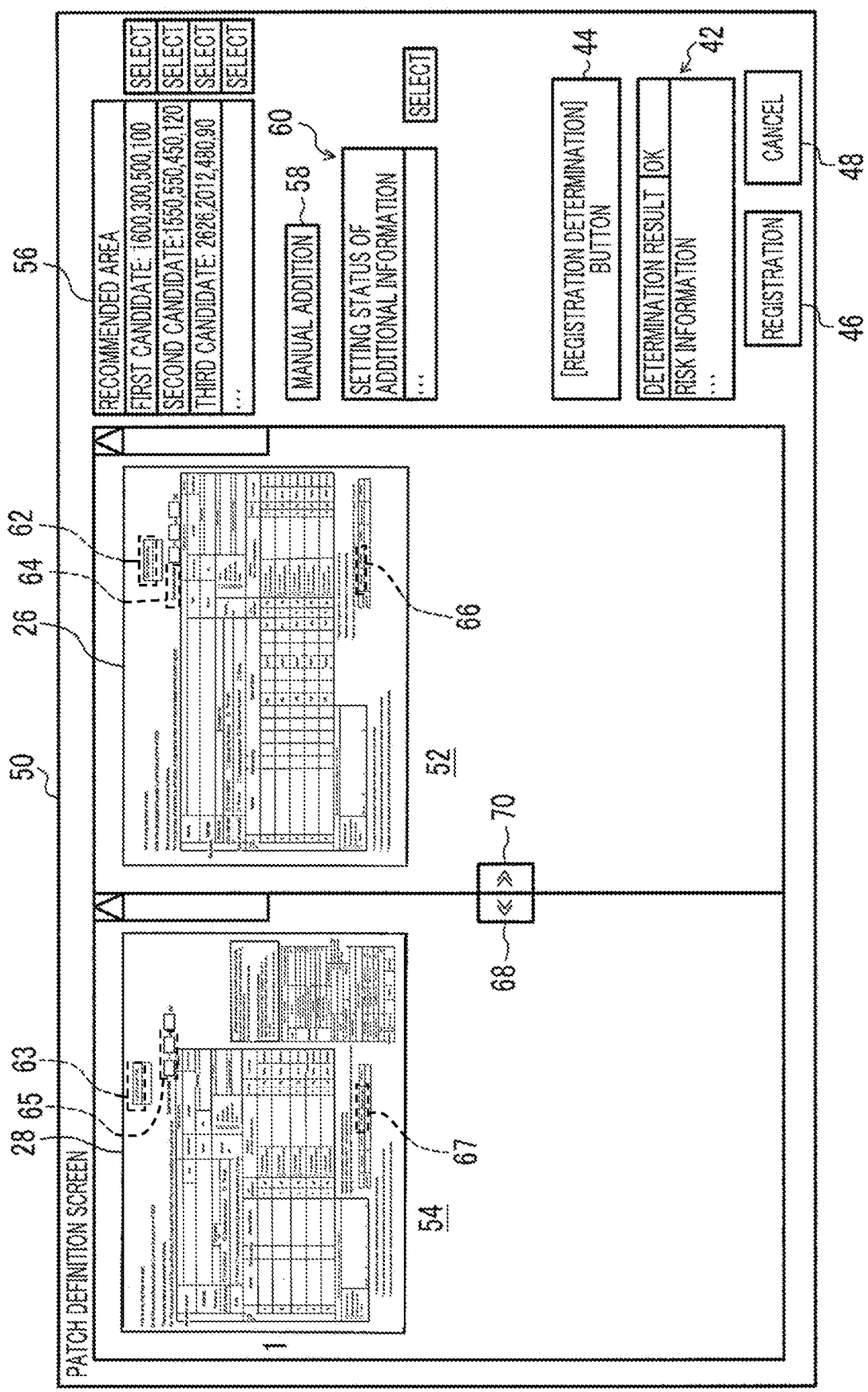
FIG. 7 is a diagram illustrating a patch definition screen.

In a case where a document is selected by the user on the patch definition screen 50, a list 56 of recommended areas related to the selected document is displayed on the patch definition screen 50. For example, as illustrated in FIG. 7, in a case where the document 26 is selected by the user on the patch definition screen 50, a list 56 of recommended areas related to the document 26 is displayed on the patch definition screen 50. Further, the processor 18 displays a mark representing each recommended area, on the document 26, in a superimposed manner. For example, marks 62, 64, and 66 are displayed to be superimposed on the document 26. The mark 62 is a mark representing a first candidate of the recommended area, the mark 64 is a mark representing a second candidate of the recommended area, and the mark 66 is a mark representing a third candidate of the recommended area. The mark 62 is displayed at a position of the first candidate of the recommended area on the document 26. The same applies to the marks 64 and 66.

The processor 18 may display the marks 62, 64, and 66, on the document 26, in a superimposed manner, according to an instruction of the user. For example, in a case where the user instructs display, the processor 18 may display the marks 62, 64, and 66, and in a case where the user instructs non-display, the processor 18 may not display the marks 62, 64, and 66.

The processor 18 may display a mark representing an area corresponding to each recommended area, on the document 28, in a superimposed manner. For example, the processor 18 displays a mark 63 representing an area corresponding to the first candidate of the recommended area, on the document 28, at the relatively same position as the position of the first candidate. Similarly, a mark 65 representing an area corresponding to the second candidate is displayed on the document 28 at the relatively same position as the position of the second candidate, and a mark 67 representing an area corresponding to the third candidate is displayed on the document 28 at the relatively same position as the position of the third candidate.

The processor 18 may display the marks 63, 65, and 67, on the document 28, in a superimposed manner, according to an instruction of the user. For example, in a case where the user instructs display, the processor 18 may display the marks 63, 65, and 67, and in a case where the user instructs non-display, the processor 18 may not display the marks 63, 65, and 67.

As described above, in a case where it is determined that the document 26 to be registered and another document 28 are similar to each other by the threshold value determination processing, the processor 18 specifies, as a recommended area, a scan area that can be distinguished from a scan area in another document 28, and informs the user of the recommended area by displaying the recommended area on the patch definition screen 50.

Figure 8:
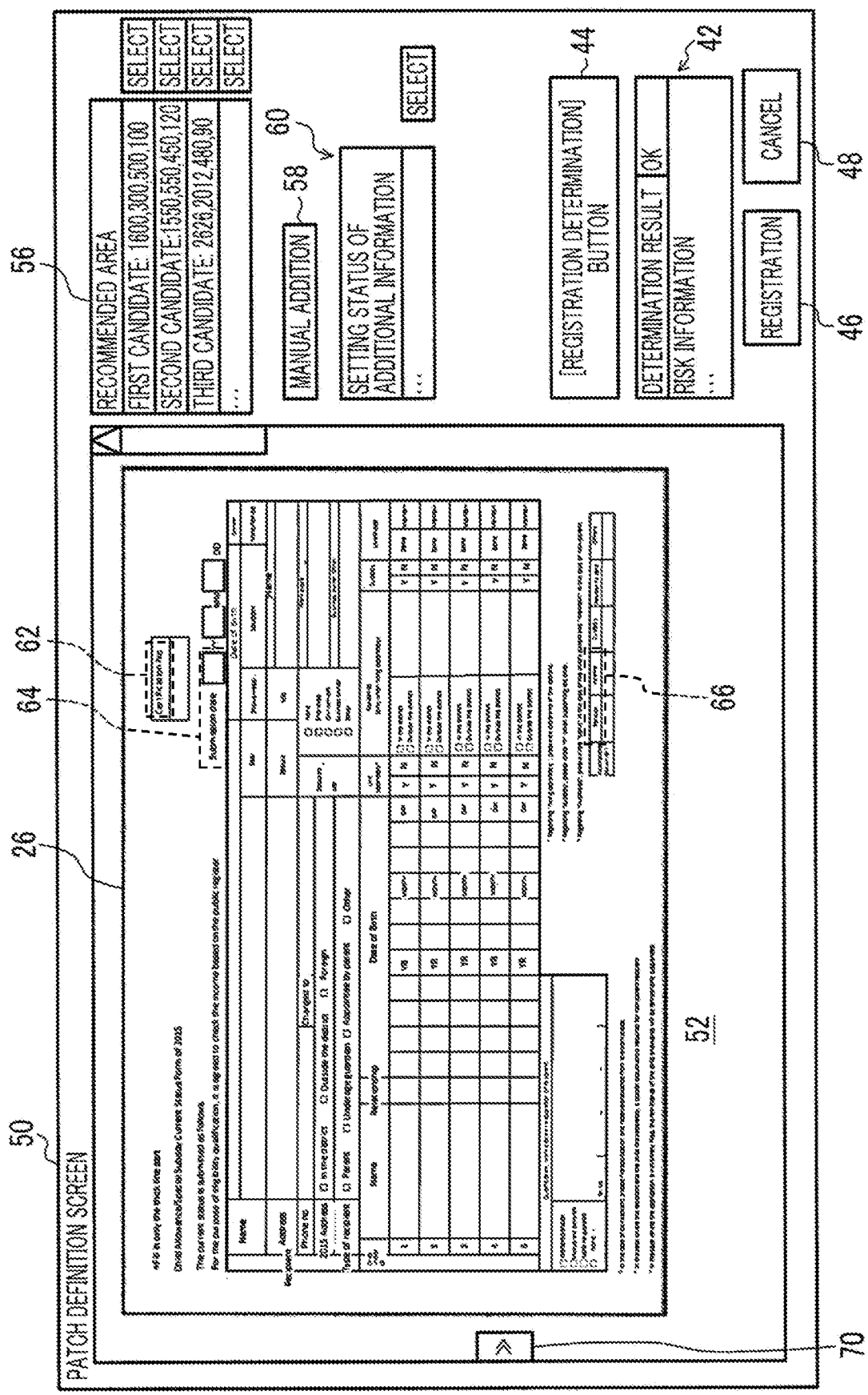
FIG. 8 is a diagram illustrating a patch definition screen.

Further, sizes of the display areas 52 and 54 may be changed. For example, buttons 68 and 70 for enlarging or reducing the display areas are displayed between the display area 52 and the display area 54. In a case where the button 68 is pressed, the processor 18 enlarges the display area 52 without forming the display area 54 on the patch definition screen 50, and displays the document 26 without displaying the document 28. In a case where the button 70 is pressed, the processor 18 enlarges the display area 54 without forming the display area 52 on the patch definition screen 50, and displays the document 28 without displaying the document 26. FIG. 8 illustrates the enlarged display area 52. In this state, in a case where the button 70 is pressed, as illustrated in FIG. 7, the display areas 52 and 54 are formed on the patch definition screen 50.

Further, in a case where the user selects a candidate of the recommended area from the list 56 of the recommended areas, the processor 18 enables a mark representing the selected candidate on the document 26. Enabling a mark means displaying a mark to be distinguished from an unselected mark, and is, for example, filling the mark, thickening a line of the mark, setting a line of the mark to be different from a line of an unselected mark, or the like.

Figure 9:
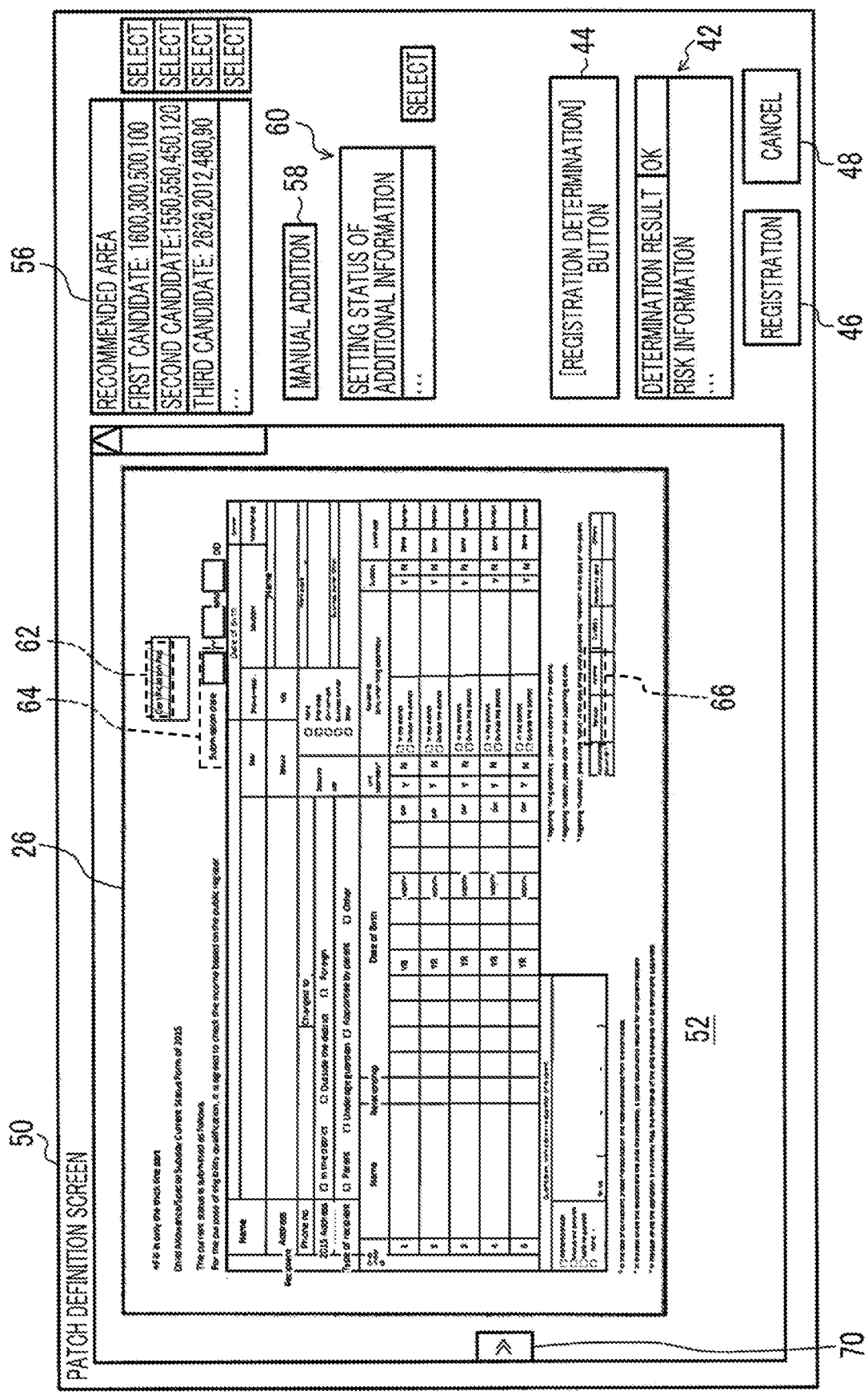
FIG. 9 is a diagram illustrating a patch definition screen.

In the example illustrated in FIG. 9, the first candidate of the recommended area is selected by the user, and the mark 62 representing the first candidate is enabled.

In a state where the first candidate selected, in a case where the button 46 for registration is pressed, the processor 18 defines, as a patch, the first candidate in the definition data. For example, the processor 18 includes information indicating coordinates of the first candidate in the document 26, in the definition data of the document 26, as information indicating coordinates of the patch. In this way, the definition data, in which the first candidate as a patch is defined, is created and registered. In classification of the document to be classified, in a case where the definition data is used, a first candidate as a patch is set in the document to be classified, information is extracted from the first candidate in the document to be classified, the extracted information is compared with the information extracted from the first candidate of the document 26 represented by the definition data, and the document to be classified is classified based on the comparison result.

A risk that may occur when a document is classified using the selected recommended area is calculated, and risk information indicating the risk may be displayed. For example, a similarity between the information extracted from the first candidate in the document 26 to be registered and the information extracted from the first candidate in another document 28 may be displayed as risk information.

Further, the processor 18 may inform the user of a combination of a plurality of recommended areas. In the above example, the processor 18 may inform the user, for example, that it is necessary to set a combination of the first candidate and the second candidate, as the definition data. Further, in a case where the document 26 and the document 28 cannot be distinguished from each other only by one recommended area (for example, in a case where a difference between the information extracted from the recommended area of the document 26 and the information extracted from the recommended area of the document 28 is smaller than a threshold value), the processor 18 may inform the user of a combination of a plurality of recommended areas. For example, in a case where the document 26 and the document 28 can be distinguished from each other by using the combination of the plurality of recommended areas, the processor 18 may inform the user of the combination of the plurality of recommended areas. For example, the processor 18 may display information indicating the combination of the plurality of recommended areas, or may display the plurality of recommended areas with emphasis, on the patch definition screen 50.

Further, the recommended area, of which the user is informed, may be an area in which a text, a symbol, a line, or the like is not expected to be entered. For example, in an area in which a text, a symbol, a figure, a line, or the like is already entered in advance (for example, a printed area or the like), a text or the like is unlikely to be entered. Thus, the user may be informed of the area, as a recommended area. In a case where, as a recommended area, an area in which a text or the like is expected to be entered is defined in the definition data and a text or the like is entered in the recommended area in the document to be classified, the document to be classified may not be accurately classified using the recommended area. By defining, as a recommended area, an area in which a text or the like is not expected to be entered in the definition data, such erroneous determination is prevented.

Figure 10:
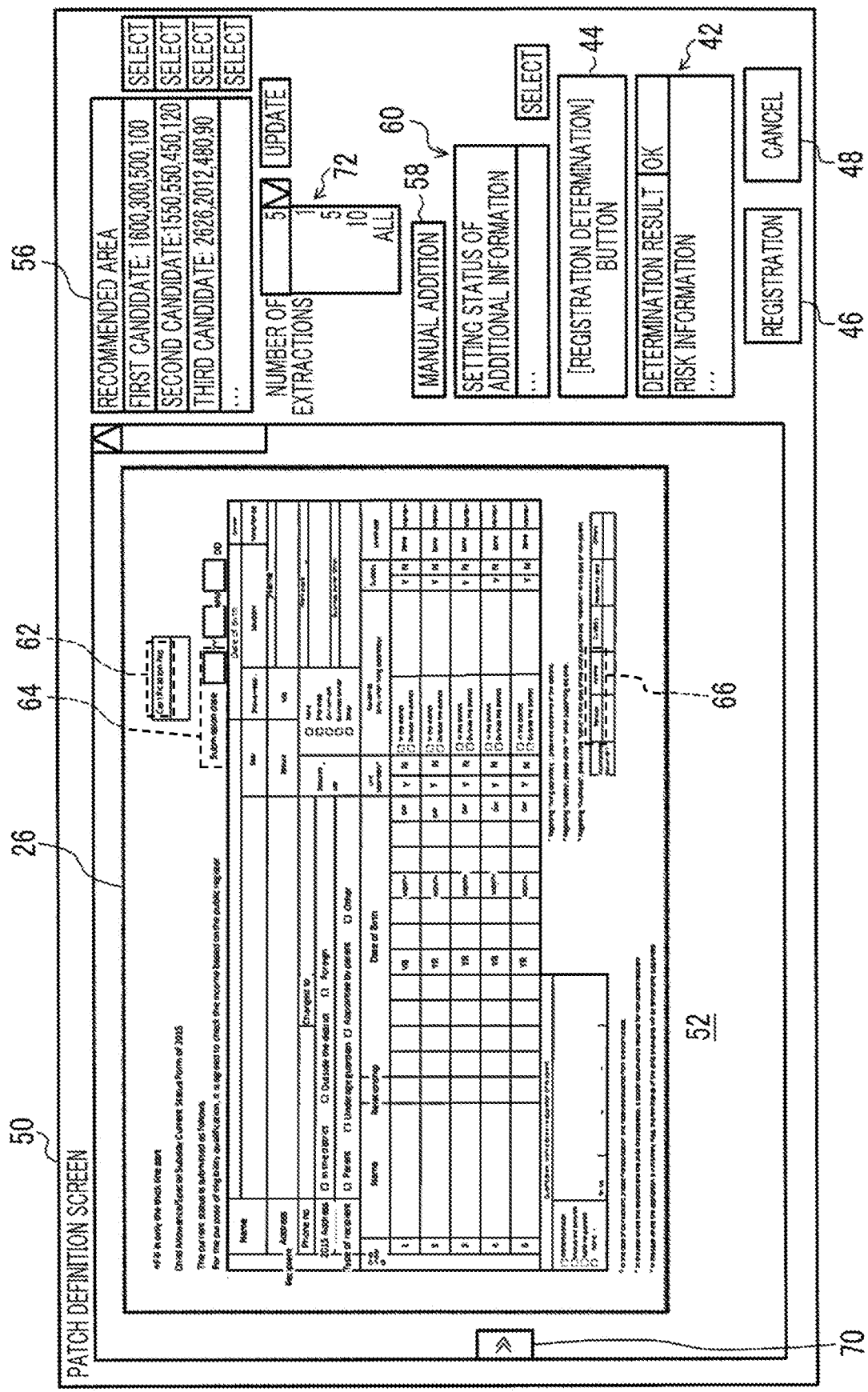
FIG. 10 is a diagram illustrating a patch definition screen.

The number of extractions of recommended areas may be designated by the user. For example, as illustrated in FIG. 10, a setting field 72 for designating the number of extractions is displayed on the patch definition screen 50. The processor 18 searches recommended areas by the number set in the setting field 72, and includes the searched recommended areas in the list 56. In the example illustrated in FIG. 10, the number of extractions is displayed by a pull-down method and the number of extractions is designated. On the other hand, the user may designate any number as the number of extractions.

Figure 11:
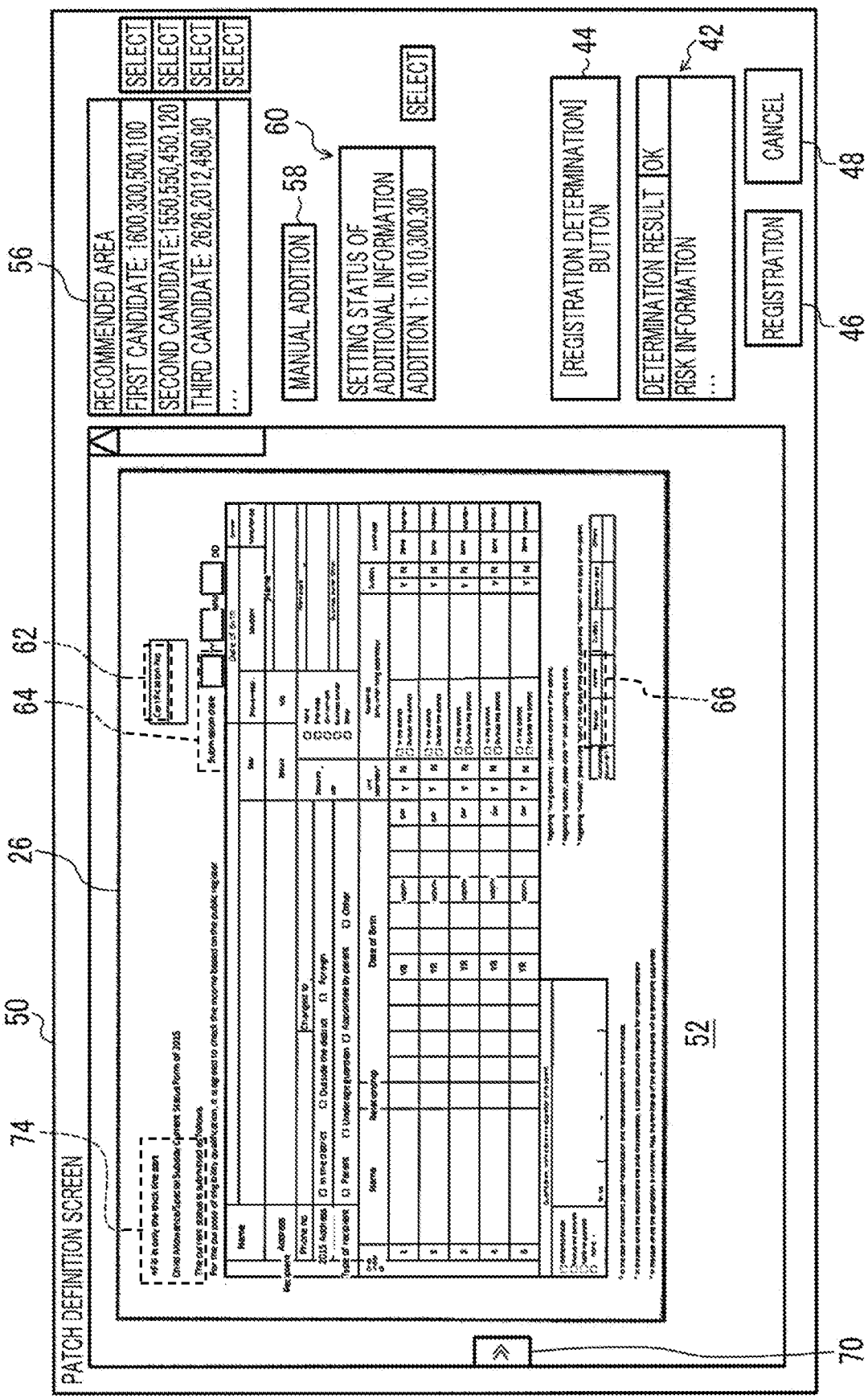
FIG. 11 is a diagram illustrating a patch definition screen.

Further, in a case where the button 58 for manually setting a patch is pressed, as illustrated in FIG. 11, the processor 18 displays a mark 74 representing an area having a predetermined size and a predetermined shape, on the document 26, in a superimposed manner. The user can move the mark 74 or change the shape of the mark 74 on the patch definition screen 50. The coordinates of the area represented by the mark 74 are displayed as indicated by a reference numeral 60.

In a case where the area designated by the user is selected as the area to be defined in the definition data, the definition data, which includes information indicating the coordinates of the area designated by the user, is created and registered.

Figure 12:
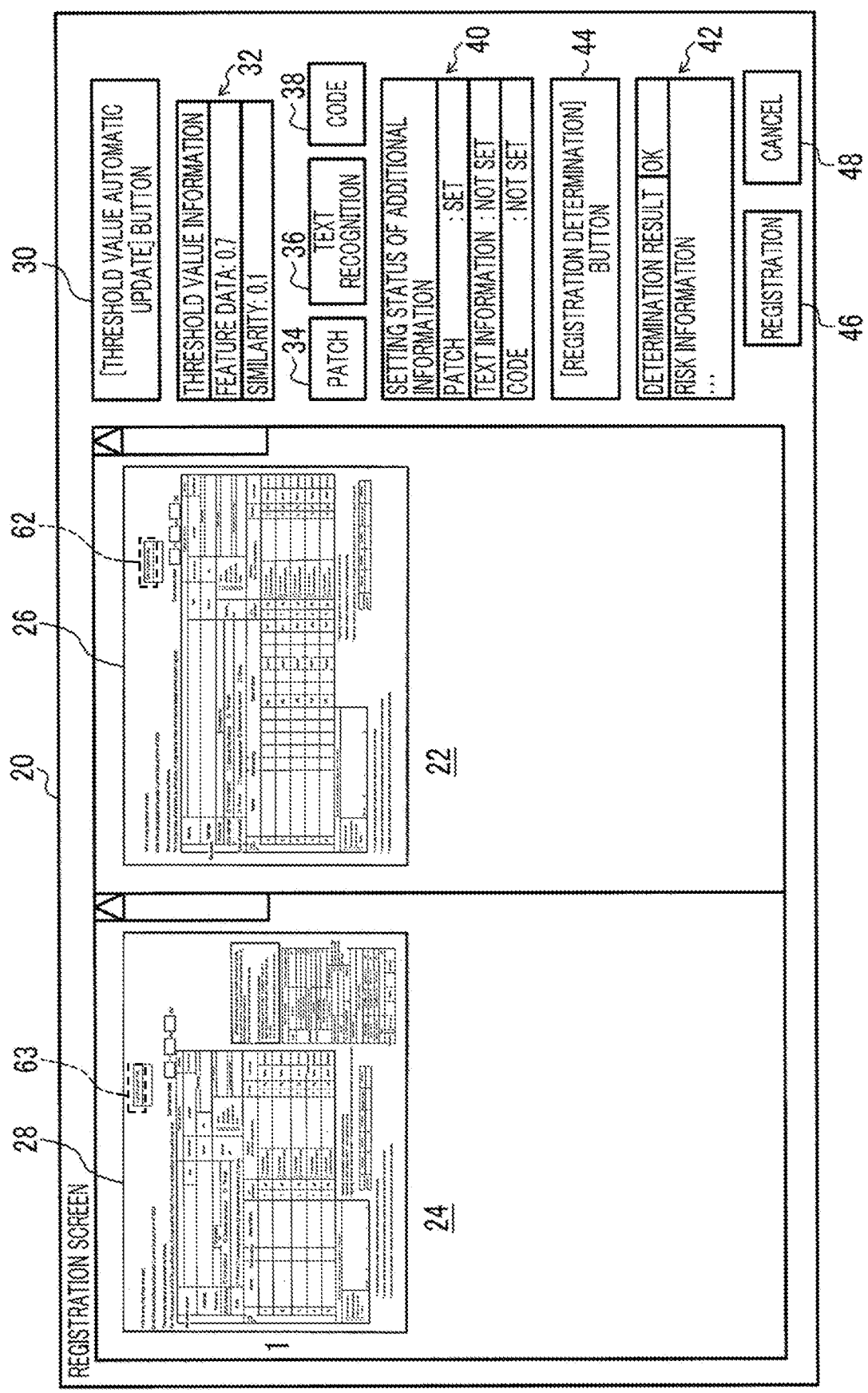
FIG. 12 is a diagram illustrating a patch definition screen.

In a case where a patch is set on the patch definition screen 50 and the button 46 for registration is pressed, the screen returns from the patch definition screen 50 to the registration screen 20. FIG. 12 illustrates the registration screen 20. Since the patch is set, as indicated by a reference numeral 40, a setting status of the patch processing is changed from "not set" to "set". Further, the coordinates of the set patch and the features of the information extracted from the patch (for example, a text, a symbol, a line, or the like) may be displayed as risk information.

For example, the first candidate is set as a patch. In this case, the processor 18 displays the mark 62 representing the first candidate, on the document 26, in a superimposed manner. Further, the processor 18 may display the mark 63 representing the area corresponding to the first candidate, on another document 28, in a superimposed manner. The mark 63 is displayed on the document 28 at the relatively same position as the position of the first candidate in the document 26.

The processor 18 may display a mark representing the patch defined in the definition data of the document 28, on the document 28, in a superimposed manner.

Figure 13:
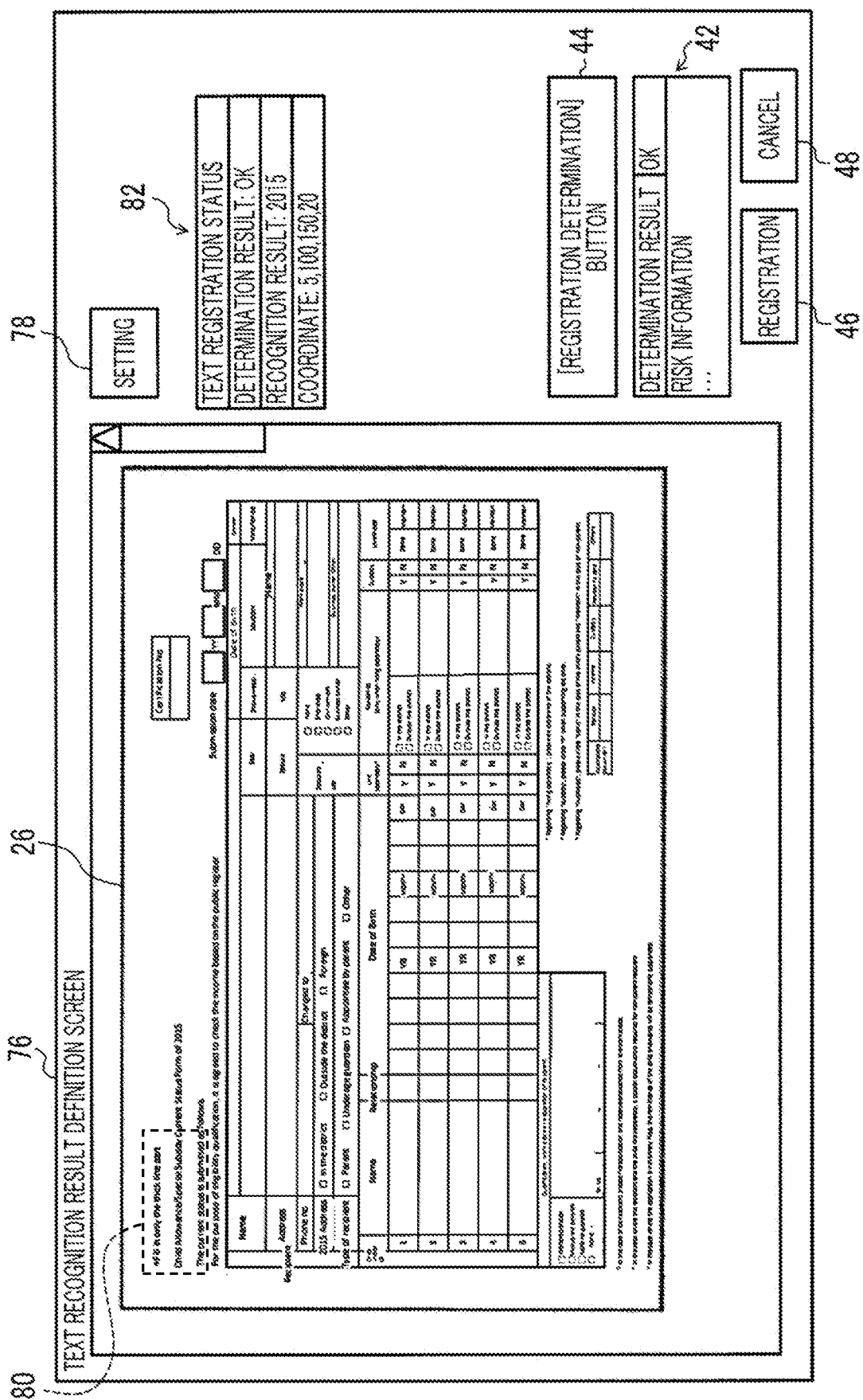
FIG. 13 is a diagram illustrating a text recognition result definition screen.

Hereinafter, the text recognition processing will be described. FIG. 13 illustrates an example of the text recognition result definition screen.

The document 26 to be registered is displayed on the text recognition result definition screen 76. Further, a button 78 for instructing setting of an area in which the text recognition processing is performed (hereinafter, referred to as "text recognition definition area") is displayed on the text recognition result definition screen 76. In a case where the button 78 is pressed, the processor 18 displays a mark 80 representing the text recognition definition area, on the document 26, in a superimposed manner. The user can change a position, a size, and a shape of the text recognition definition area by changing a position, a size, and a shape of the mark 80. As indicated by a reference numeral 82, a relative position of the text recognition definition area in the document 26 (for example, coordinates of the text recognition definition area in the document 26) is displayed. Further, in a case where a text is recognized by the text recognition processing on the text recognition definition area, information indicating that the text is recognized (for example, "OK") and the recognition result (for example, "2015") are displayed.

Further, risk information indicating a risk that may occur by performing the text recognition processing when classifying the document may be displayed. In general, as the number of texts that are subjected to the text recognition processing increases, a document can be more accurately classified. Thus, risk information indicating the fact may be displayed. For example, information such as "set a threshold value for determination of text recognition to five characters or more" or "accuracy in document classification can be improved in a case where an area in which a character string of the recognition result includes 10 characters or more is defined as a text recognition definition area" may be displayed as risk information. As indicated by a reference numeral 82, the determination result is displayed, and thus the risk information may not be displayed. Alternatively, the determination result may not be displayed and the risk information may be displayed.

In a state where the text recognition definition area is set, in a case where the button 46 for registration is pressed, the processor 18 defines the text recognition definition area in the definition data. For example, the processor 18 includes information indicating coordinates of the text recognition definition area in the document 26, in the definition data of the document 26. In this way, the definition data, in which the text recognition definition area is defined, is created and registered. Further, on the registration screen 20, a setting status of the text recognition processing is changed from "not set" to "set". In classification of the document to be classified, in a case where the definition data is used, a text recognition definition area is set in the document to be classified, a text is recognized from the text recognition definition area in the document to be classified, the recognized text is compared with a text recognized from the text recognition definition area of the document 26 represented by the definition data, and the document to be classified is classified based on the comparison result.

Figure 14:
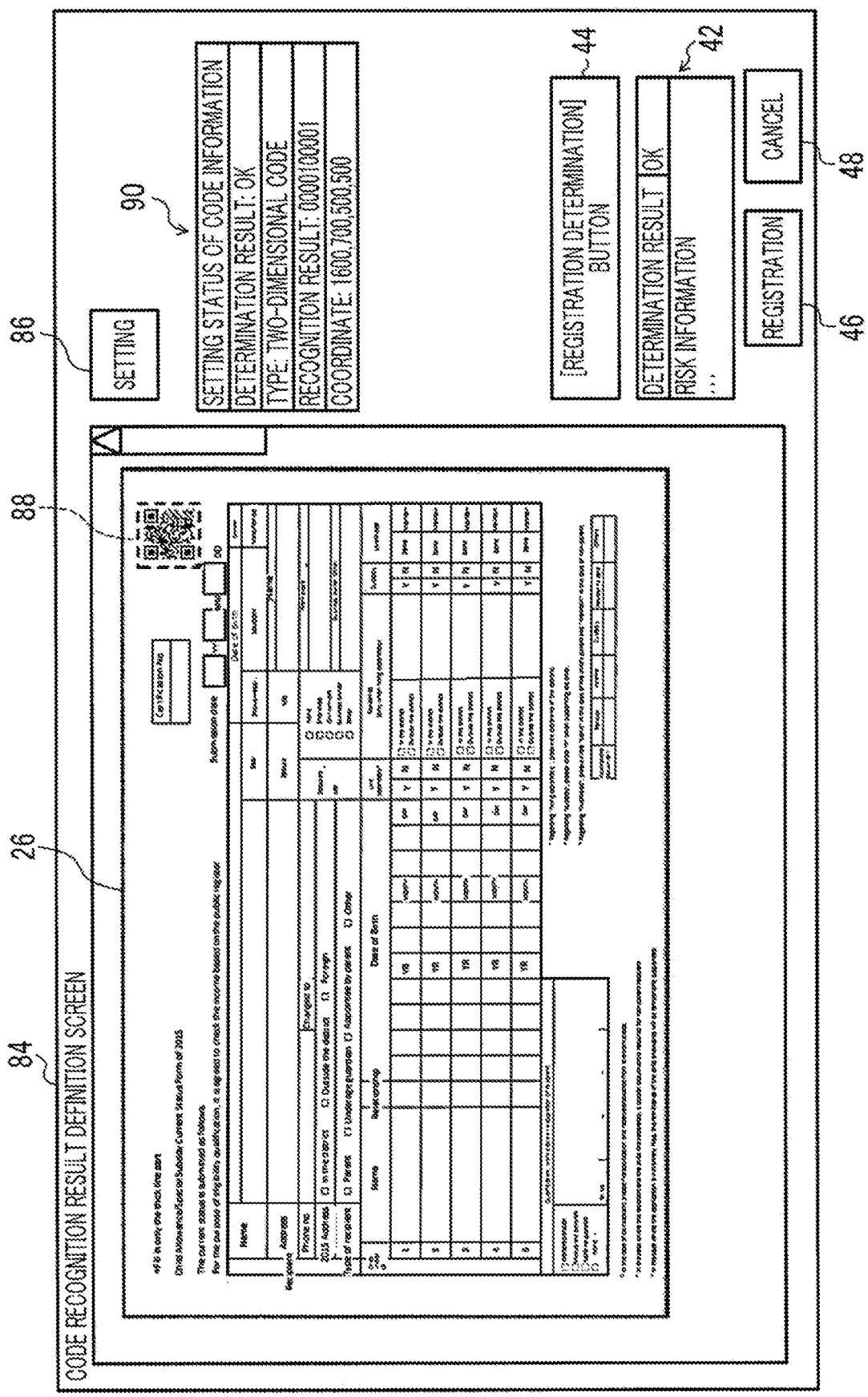
FIG. 14 is a diagram illustrating a code recognition result definition screen.

Hereinafter, the code processing will be described. FIG. 14 illustrates an example of the code recognition result definition screen.

The document 26 to be registered is displayed on the code recognition result definition screen 84. Further, a button 86 for instructing setting of an area from which a barcode or a two-dimensional code is read (hereinafter, referred to as "code definition area") is displayed on the code recognition result definition screen 84. In a case where the button 86 is pressed, the processor 18 displays a mark 88 representing the code definition area, on the document 26, in a superimposed manner. The user can change a position, a size, and a shape of the code definition area by changing a position, a size, and a shape of the mark 88. As indicated by a reference numeral 90, a relative position of the code definition area in the document 26 (for example, coordinates of the code definition area in the document 26) is displayed. Further, in a case where the code is read by reading processing on the code definition area, information indicating that the code is read (for example, "OK"), a type of the read code (for example, "two-dimensional code"), and the reading result are displayed.

Further, risk information indicating a risk that may occur by performing the code processing when classifying the document may be displayed. For example, an error correction level, a recommended level, or the like may be displayed as risk information.

In a state where the code definition area is set, in a case where the button 46 for registration is pressed, the processor 18 defines the code definition area in the definition data. For example, the processor 18 includes information indicating coordinates of the code definition area in the document 26, in the definition data of the document 26. In this way, the definition data, in which the code definition area is defined, is created and registered. In classification of the document to be classified, in a case where the definition data is used, a code definition area is set in the document to be classified, a code is read from the code definition area in the document to be classified, and the document to be classified is classified based on the read result. The code includes information indicating the type of the document, and the type of the document can be specified by reading the code. Therefore, the document can be classified.

By performing text recognition processing on the classified document according to the classification, processing of recognizing a text from the classified document or processing of correcting the recognition result may be performed. Of course, the processing may not be performed.

In the embodiments above, the term "processor" refers to hardware in abroad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
    a processor configured to
        receive first document data representing a first document in a case of registering first definition data which defines classification of the first document, the first document data being data for creating the first definition data; and
        output a warning in a case where the first document data is similar to second document data of second definition data already registered,
    wherein the second document data of the second definition data comprises a plurality of pages, at least two pages of the plurality of pages are displayed side by side when a similarity between the first document data and each page of the at least two pages is equal to or higher than a threshold value,
    wherein each page of the at least two pages displayed side by side is separated by a separator,
    wherein, when a user selects one of the at least two pages displayed side by side as a selected page, a similarity between the selected page and the first document data is displayed as information related to the threshold value,
    wherein when the first document data for creating the first definition data is distinguished from the second document data of the registered second definition data by updating the threshold value, the processor is configured to enable a button for instructing an automatic update of the threshold value,
    wherein when the first document data for creating the first definition data is not distinguished from the second document data of the registered second definition data by updating the threshold value, the processor is configured to disable the button for instructing the automatic update of the threshold value.

2. The information processing apparatus according to claim 1,
    wherein the processor is configured to
        output a warning in a case where a similarity based on feature data of the first document data and feature data of the second document data is equal to or higher than a threshold value.

3. The information processing apparatus according to claim 1,
    wherein the processor is further configured to
        inform a user of an area that is an area in the first document represented by the first document data and is distinguished from an area in a second document represented by the second document data in a case where it is determined that the first document data and the second document data are similar based on pieces of feature data.

4. The information processing apparatus according to claim 2,
    wherein the processor is further configured to
        inform a user of an area that is an area in the document represented by the first document data and is distinguished from an area in a second document represented by the second document data in a case where it is determined that the first document data and the second document data are similar based on pieces of the feature data.

5. The information processing apparatus according to claim 3,
    wherein the processor is configured to
        inform the user of a combination of a plurality of areas.

6. The information processing apparatus according to claim 4,
    wherein the processor is configured to
        inform the user of a combination of a plurality of areas.

7. The information processing apparatus according to claim 3,
    wherein the area of which the user is informed is an area in which a text is not to be entered.

8. The information processing apparatus according to claim 4,
    wherein the area of which the user is informed is an area in which a text is not to be entered.

9. The information processing apparatus according to claim 5,
    wherein the areas of which the user is informed are areas in which a text is not to be entered.

10. The information processing apparatus according to claim 6,
    wherein the areas of which the user is informed are areas in which a text is not to he entered.

11. The information processing apparatus according to claim 3,
    wherein the processor is further configured to
        cause a display device to display the first document represented by the first document data and the second document represented by the second document data side by side,
        cause the display device to display the area of which the user is informed, on the first document, in a superimposed manner, and
        cause the display device to display an area corresponding to the area of which the user is infoinied, on the second document, in a superimposed manner.

12. The information processing apparatus according to claim 4,
    wherein the processor is further configured to
        cause a display device to display the first document represented by the first document data and the second document represented by the second document data side by side,
        cause the display device to display the area of which the user is informed, on the first document, in a superimposed manner, and
        cause the display device to display an area corresponding to the area of which the user is informed, on the second document, in a superimposed manner.

13. The information processing apparatus according to claim 5,
wherein the processor is further configured to
cause a display device to display the first document represented by the first document data and the second document represented by the second document data side by side,
cause the display device to display the areas of which the user is informed, on the first document, in a superimposed manner, and
cause the display device to display areas corresponding to the areas of which the user is informed, on the second document, in a superimposed manner.

14. The information processing apparatus according to claim 6,
wherein the processor is further configured to
cause a display device to display the first document represented by the first document data and the second document represented by the second document data side by side,
cause the display device to display the areas of which the user is informed, on the first document, in a superimposed manner, and
cause the display device to display areas corresponding to the areas of which the user is informed, on the second document, in a superimposed manner.

15. The information processing apparatus according to claim 7,
wherein the processor is further configured to
cause a display device to display the first document represented by the first document data and the second document represented by the second document data side by side,
cause the display device to display the area of which the user is informed, on the first document, in a superimposed manner, and
cause the display device to display an area corresponding to the area of which the user is informed, on the second document, in a superimposed manner.

16. The information processing apparatus according to claim 3,
wherein the processor is further configured to
inform the user that the first document data and the second document data are distinguished from each other by text recognition processing in a case where an area that is distinguished from an area in the second document represented by the second document data is not extracted from the first document represented by the first document data.

17. The information processing apparatus according to claim 1,
wherein the processor is further configured to
inform a user of a plurality of pieces of partial area determination processing as processing of distinguishing the first document data from the second document data, based on partial areas of the first document data.

18. The information processing apparatus according to claim 17,
wherein the processor is further configured to
display instruction portions that define each of the pieces of partial area determination processing on the same screen.

19. The information processing apparatus according to claim 17,
wherein the processor is further configured to
display a setting status of the plurality of pieces of partial area determination processing.

20. A non-transitory computer readable medium storing a program causing a computer to:
receive first document data representing a first document in a case of registering first definition data which defines classification of the first document, the first document data being data for creating the first definition data; and
output a warning in a case where the first document data is similar to second document data of second definition data already registered,
wherein the second document data of the second definition data comprises a plurality of pages, at least two pages of the plurality of pages are displayed side by side when a similarity between the first document data and each page of the at least two pages is equal to or higher than a threshold value,
wherein each page of the at least two pages displayed side by side is separated by a separator,
wherein, when a user selects one of the at least two pages displayed side by side as a selected page, a similarity between the selected page and the first document data is displayed as information related to the threshold value,.
wherein when the first document data for creating the first definition data is distinguished from the second document data of the registered second definition data by updating the threshold value, a button for instructing an automatic update of the threshold value is enabled,
wherein when the first document data for creating the first definition data is not distinguished from the second document data of the registered second definition data by updating the threshold value, the button for instructing he automatic update of the threshold value is disabled.

* * * * *